United States Patent Office 2,848,906
Patented Aug. 26, 1958

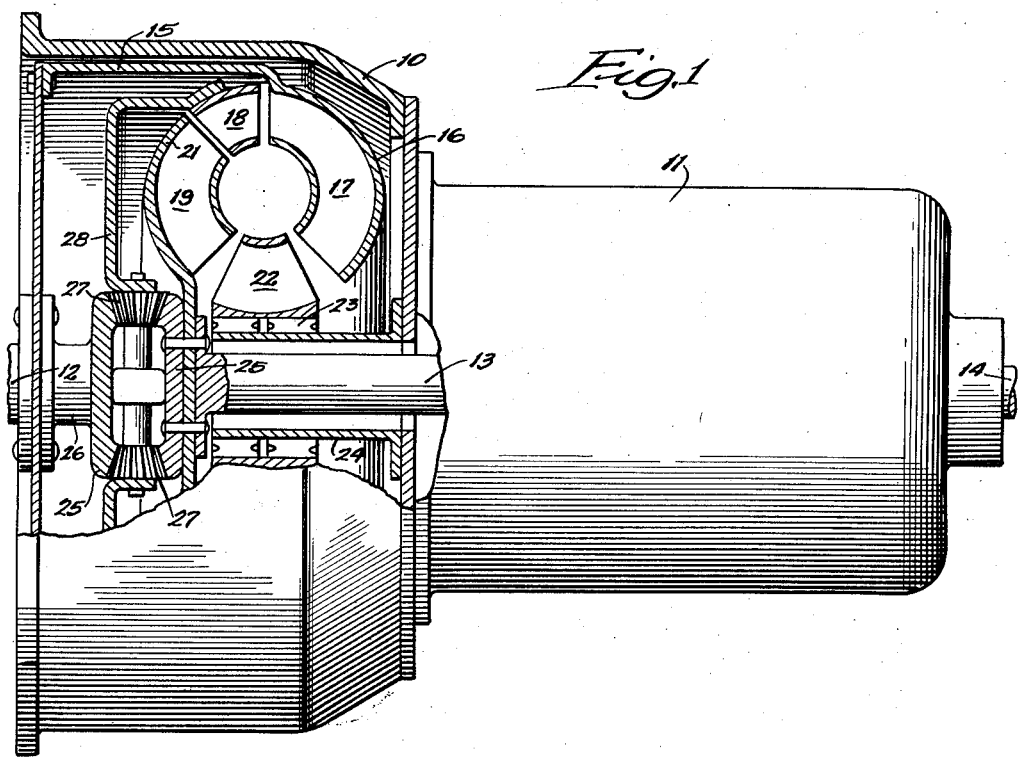

2,848,906

HYDRAULIC TORQUE CONVERTER

Adiel Y. Dodge, Rockford, Ill., assignor to Borg-Warner Corporation, Chicago, Ill., a corporation of Illinois Application April 27, 1953, Serial No. 351,374

3 Claims. (Cl. 74—677)

This invention relates to hydraulic torque converters and more particularly to a hydraulic variable speed multiplying unit of the type adapted for use in automotive vehicles. Hydraulic torque converters have been used for many years to transmit torque from the engine to the driving wheels of automotive vehicles. One of the principal difficulties encountered in the use of such units is in efficiency of operation over a wide range of speeds and torques and in minimizing fluid shock in the circuit under various operating conditions.

In my Patent No. 2,235,672, I have proposed the use of an auxiliary vaned rotor or turbine element between the outlet of the impeller or pump vanes and the inlet of the main driven rotor or turbine vanes which is so connected to the other elements that it will turn at speeds between the speeds of the driving and driven members. Such an auxiliary rotor can be employed to increase the starting torque, and will also smooth out the flow of fluid between the driving and driven members where the most abrupt change normally occurs.

The present invention relates to a hydraulic torque converter generally similar to that of my patent and has for one of its objects simplification of the construction over that shown in the patent and improved control of the speed of the auxiliary rotor.

Another object is to provide a hydraulic torque converter in which the speed of the auxiliary rotor is controlled by connecting it through differential gearing to stator and the main driven rotor.

According to one feature of the invention, the stator is formed by a plurality of separately rotatable rings and the differential gearing is connected to the ring closest to the pump inlet. This feature retains the major benefits of multiple ring stators while extending the torque speed range of the converter to speeds higher than those obtained with conventional constructions.

A further object is to provide a hydraulic torque converter in which the gearing connecting the auxiliary rotor to the other members may be of small size for compactness and cost savings and can provide substantial desired gear ratio.

The above and other objects and features of the invention will be more readily apparent from the following description when read in connection with the accompanying drawing in which:

Figures 1 and 2 are axial sections with parts in elevation of alternative forms of torque converters embodying the invention.

The torque converter of Figure 1 comprises an outer fixed casing 10 which may be a transmission housing and which may support a gear casing 11 containing gearing for changing the driving ratios and for producing reverse drive. The torque converter is adapted to connect an input shaft 12, which may be the crankshaft of an engine, or an extension thereof, to a driven shaft 13 which transmits the torque into the gear set. A final output shaft 14 from the gear set may be connected through the usual differential to the driving wheels of a vehicle.

The torque converter itself comprises a housing 15 secured to the driving shaft and to be driven thereby and which is formed with an inwardly curved wall 16 carrying a set of driving or pump vanes 17. The pump vanes extend generally radially and will produce an outward toroidal flow of liquid in the circuit.

Adjacent to the outlet of the pump vanes there is arranged an auxiliary turbine, or rotor, including a set of vanes 18 in alinement with the vanes 17. Discharge from the auxiliary rotor vanes 18 is in to a set of rotor vanes 19 carried by a shell 21 which is secured directly to the driven shaft 13.

A stator 22 is mounted between the outlet of the main rotor vanes 19 and the inlet of the pump vanes 17. The stator 22 is carried on a one-way brake 23 which is supported on a sleeve 24 fixed to the housing 10. The brake 23 is set to permit forward rotation of the stator in the same direction as the driving shaft 12, but to prevent reverse rotation.

The auxiliary rotor is connected through a differential gear set to the driving and driven members of the torque converter so that its speed will always be intermediate the speeds of the driving and driven members. As shown, the differential gearing comprises a pair of bevel face gear 25, one of which is secured to an extension 26 of the driving shaft 12 and the other of which is secured directly to the driven shaft. Planet pinions 27 mesh with the face gears 25 and are carried by a shell 28 which is secured to the auxiliary rotor 18.

In this construction, when the driving shaft is turning, fluid will be circulated radially outward over the vanes 17 in a toroidal circuit through the auxiliary rotor, the main rotor and the stator. At relatively low speeds and high torques, liquid discharge from the pump vanes 17 will act first on the auxiliary rotor vanes and will tend to turn the auxiliary rotor forward. If the load is such as to hold the driven shaft stationary, the auxiliary rotor will, under these conditions, be turned forward through the differential gear at a speed approximately one-half the speed of the driving shaft. With face gears of equal sizes, as shown, the speed of the auxiliary rotor will be exactly one-half that of the driving shaft, but it will be apparent that the gearing could be varied as desired to alter this relationship.

Since the auxiliary rotor vanes are turning, fluid will pass into them from the pump with substantially less shock than if they were stationary and because their speed is less than the pump speed, the fluid will pass from the auxiliary vanes into the main rotor vanes with less shock. A high degree of efficiency is therefore obtained through the fluid so that the torque converter can pick up the load more effectively. As the driven rotor starts to turn, the speed of the auxiliary rotor will be maintained at a speed between that of the pump and of the main driven rotor at all times. Smooth flow of liquid is therefore maintained with a minimum of shock and with resultant high operating efficiencies. When the speed of one to one is reached, the auxiliary and main driven rotors will turn at nearly the same speed approaching that of the pump and the stator will overrun on the one-way brake 23, as is understood.

In the construction of Figure 2, parts corresponding to identical parts in Figure 1 have been indicated by the same reference numerals, plus 100. In this construction, the stator is divided into a pair of stator rings 120 and 122 with the stator ring 120 lying adjacent to the outlet of the main rotor ring 119 and the ring 122 lying adjacent to the inlet of the pump vanes. The stator rings are supported and held against reverse rotation by separate one-way brakes 123.

All of the vanes of the several vaned elements carry annular core sections 131 which together form an annular core in the center of the toroidal circuit formed by the vaned elements. The auxiliary rotor 118 carries an annular internal gear 132 which lies within the core and the second stator ring 122 carries an external annular gear 133 lying within the ring. The main rotor 119 carries a series of pinions 134 meshing with the annular gears 132 and 133 to form therewith a planetary differential gear set.

In operation of this unit, when the driven shaft is stalled, both turbine rotors will remain stationary and both stator rings will rest against their one-way brakes. As the speed of the pump is increased, the force of the fluid impinging against the auxiliary rotary vanes 118 will become sufficient to move the auxiliary rotor forward. Since the stator ring 122 is held against reverse rotation, the auxiliary rotor will tend to drive the main rotor through the differential gearing and this force will be added to the driving force of the fluid impinging on the main rotor vanes. However, the diffierential gearing effects a torque multiplication between the auxiliary rotor and the main rotor so that torque on the auxiliary rotor is multiplied and added to the main rotor and will serve to pick up the load and turn the driven shaft. Therefore, the stalled torque of the torque converter is increased and it will start to drive the load at a lower input torque than with a conventional torque converter. At the same time, the speed of the auxiliary rotor will be at a value between the pump speed and the main rotor speed so that the fluid can flow with a minimum of shock.

As the speed increases, liquid discharged from the first stator ring 120 will strike the backs of the vanes on the stator ring 122 and will tend to drive this stator forward. The reaction torque through the differential gear set will, however, prevent the stator ring 122 from turning forward until the turning force becomes quite substantial so that it will be an effective fulcrum until a higher speed, lower torque driving condition is reached. At a slightly higher speed and lower torque, while the stator ring 122 is still held against turning by the torque reaction through the gear set, the fluid may strike the back of the vanes of stator ring 120 and drive the stator ring 120 forward. Forward rotation of the stator ring 120 will minimize shock as the fluid travels in the circuit to maintain operating efficiency at a relatively high value.

At still higher speeds and lower torques, the fluid pressure against the back sides of the vanes on stator ring 122 will become sufficient to turn this ring forward. At this time, the main and auxiliary rotors will be turning forward at substantially the same speed and both of the stator rings will be turning forward to produce approximately a one to one drive.

While two embodiments of the invention have been shown and described herein, it will be understood that they are illustrative only and not to be taken as a definition of the scope of the invention, reference being had for this purpose to the appended claims.

What is claimed is:

1. A hydraulic torque converter to connect driving and driven shafts comprising a vaned pump, a vaned auxiliary turbine adjacent to the fluid outlet of the pump, a vaned main turbine at the fluid outlet side of the auxiliary turbine, vaned stator means including a pair of independently rotatable vaned stator rings lying between the main turbine outlet and the pump inlet, means to connect the pump to the driving shaft, means to connect the main turbine to the driven shaft, one-way brakes to hold the stator rings separately against reverse rotation, and a differential gear set including three relatively rotatable elements connected respectively to the main and auxiliary turbines and to said stator ring closest to the pump inlet.

2. A hydraulic torque converter comprising coaxial rotatable driving, driven and auxiliary members and a plurality of stator ring members all having cooperating vanes and arranged in a closed fluid circuit, one-way brakes to hold the stator ring members against reverse rotation, there being two stator rings adjacent to each other between the outlet of the driven member and the inlet of the driving member, and differential gearing interconnecting the stator ring closest to the driving member inlet with two of the other members.

3. A hydraulic torque converter comprising coaxial rotatable driving, driven and auxiliary members and a plurality of stator ring members all having cooperating vanes and arranged in a closed fluid circuit, one-way brakes to hold the stator ring members against reverse rotation, there being two stator rings adjacent to each other between the outlet of the driven member and the inlet of the driving member, and differential gearing interconnecting the stator ring closest to the driving member inlet with the driven and auxiliary members.

References Cited in the file of this patent

UNITED STATES PATENTS

| 2,235,672 | Dodge | Mar. 18, 1941 |
| 2,616,309 | Russell | Nov. 4, 1952 |
| 2,739,494 | Russell | Mar. 27, 1956 |
| 2,766,641 | Kelley | Oct. 16, 1956 |

FOREIGN PATENTS

| 815,151 | Germany | Sept. 27, 1951 |